United States Patent
Nakamura et al.

[11] Patent Number: 5,357,279
[45] Date of Patent: Oct. 18, 1994

[54] AUTOMATIC KNEE CONTROL CIRCUIT

[75] Inventors: Takashi Nakamura; Satoshi Yamaga, both of Kanagawa, Japan

[73] Assignee: Sony Corporation, Japan

[21] Appl. No.: 22,402

[22] Filed: Feb. 24, 1993

Related U.S. Application Data

[63] Continuation of Ser. No. 667,593, Mar. 8, 1991.

[30] Foreign Application Priority Data

Mar. 26, 1990 [JP] Japan ................................. 2-75900
Mar. 28, 1990 [JP] Japan ................................. 2-79112

[51] Int. Cl.$^5$ .................... H04N 5/30; H04N 5/235; H04N 5/52
[52] U.S. Cl. .................................. 348/207; 348/254; 348/255; 348/257; 348/678; 348/687; 348/691; 348/686; 348/696
[58] Field of Search ............. 358/164, 168, 169, 170, 358/171, 174

[56] References Cited

U.S. PATENT DOCUMENTS

| | | | |
|---|---|---|---|
| 4,415,866 | 11/1983 | Wermuth | 330/278 |
| 4,470,067 | 9/1984 | Mino | 358/174 |
| 4,797,744 | 1/1989 | Klemmer et al. | 358/164 |
| 4,821,100 | 4/1989 | Yamamoto | 358/170 |
| 4,862,270 | 8/1989 | Nishio | 358/160 |
| 4,980,756 | 12/1990 | Lagoni | 358/39 |
| 5,162,902 | 11/1992 | Bell et al. | 358/168 |
| 5,221,963 | 6/1993 | Hashimoto et al. | 358/209 |

OTHER PUBLICATIONS

Applicant's Submitted Prior Art (FIG. 4).

Primary Examiner—Yon J. Couso
Assistant Examiner—Bipin Shalwala
Attorney, Agent, or Firm—Ronald P. Kananen

[57] ABSTRACT

An automatic knee control circuit including a knee circuit for setting a knee point and a knee slope, a detecting circuit for detecting an output signal of the knee circuit and a comparing circuit for comparing an output of the detecting circuit with a reference voltage, wherein the knee circuit is controlled on the basis of an output of the comparing circuit. This automatic knee control circuit is characterized by a distributing circuit for distributing the output of the comparing circuit by an arbitrary distributing ratio, wherein the setting of the knee point is controlled by a first distributed output and the setting of the knee slope is controlled by a second distributed output, thereby making it possible to set a wide variety of signal processing states with ease. Therefore, pictures corresponding to cameraman's intention can be produced.

18 Claims, 8 Drawing Sheets

AUTOMATIC KNEE CONTROL CIRCUIT

This application is a continuation of application Serial No. 07/667,593 filed Mar. 8, 1991.

BACKGROUND OF THE INVENTION

1. Field of the Invention

The present invention relates to an automatic knee control circuit for use with a television camera or the like.

2. Description of the Prior Art

Conventionally, in order to cope with a wide variety of the change of the amount of incident light, a television camera utilizes a white level compressing circuit which might be called a knee circuit.

Figure 1:
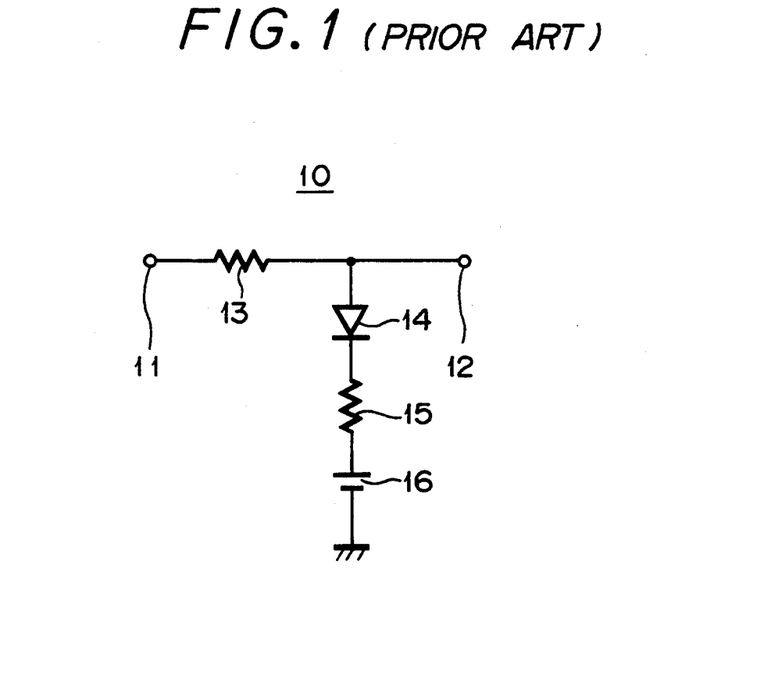
FIG. 1 is a schematic diagram showing an example of a knee circuit according to the prior art.

A conventional knee circuit 10 is shown, for example, in FIG. 1. As shown in FIG. 1, a resistor 13 is interposed between an input terminal 11 to which a video signal from a camera section (not shown) is supplied and an output terminal 12, and a diode 14, a resistor 15 and a reference voltage source 16 are connected in series between the output terminal 12 and ground.

Figure 2:
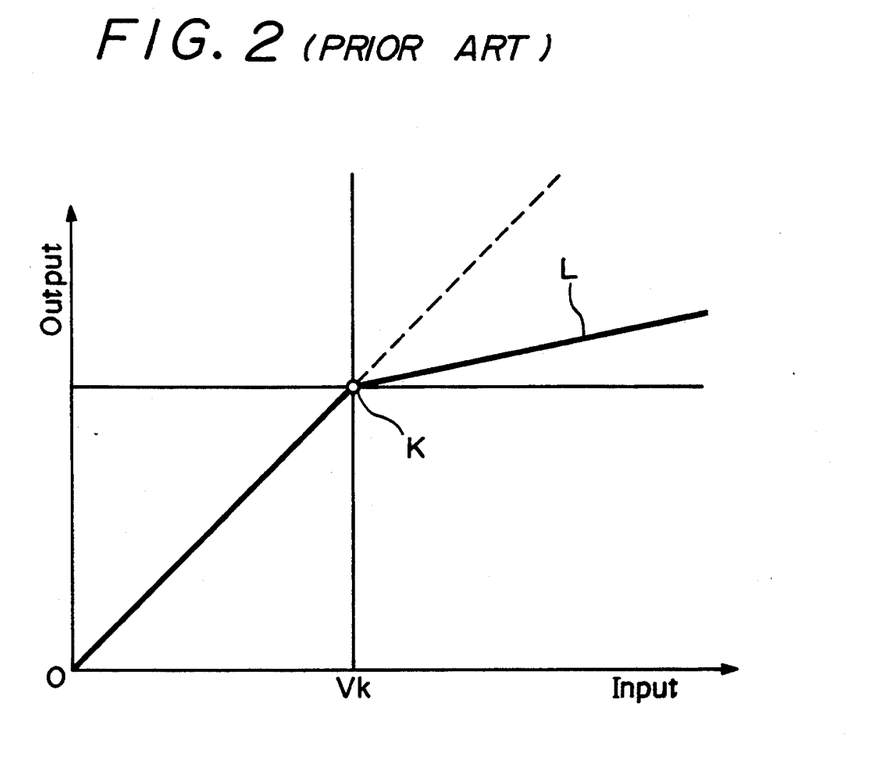
FIG. 2 is a characteristic graph of input and output characteristic of a main portion of the conventional knee circuit of FIG. 1.

As shown in FIG. 2, an input and output characteristic of this knee circuit is linear up to a predetermined input level (knee point) Vk. When an input signal whose level is beyond the knee point Vk is supplied to this knee circuit 10, the diode 15 is turned on. The output signal is compressed on the basis of a ratio between resistance values of the two resistors 13 and 15 so that the change of the output level becomes gentle as shown by the straight line L. The inclination of the straight line L is what might be called a knee slope.

In the knee circuit 10 shown in FIG. 1, the reference voltage Vr of the reference voltage source 16 is set so that the range of the change of the incident light amount falls within, for example, 300%. Thus, the output level will exceed a predetermined upper limit value if the incident light amount in a wider variety such as, for example, 600%, and as a result, the succeeding circuit cannot cope with such change of incident light amount.

Therefore, the assignee of the present application has previously proposed an automatic knee control circuit which can automatically control a reference voltage in response to an input level (see Japanese Laid-Open Patent Gazette No. 61-46675).

Figure 3:
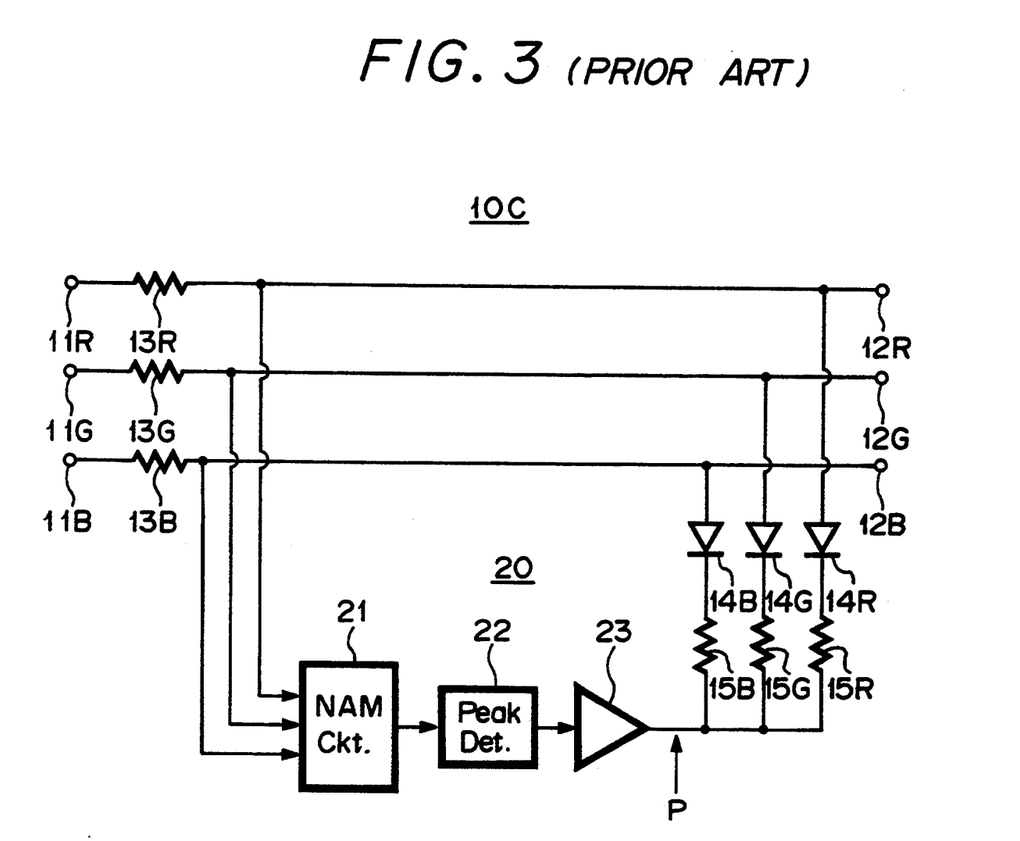
FIG. 3 is a schematic diagram showing an example of an automatic knee control circuit according to the prior art.

In this automatic knee control circuit 10C, as shown in FIG. 3, respective input color signals R, G and B applied to terminals 11R, 11G and 11B are supplied through resistors 13R, 13G and 13B to a non-additive mixing circuit (NAM) circuit 21 in a control circuit 20, from which the signal of the highest level of the three signals is supplied to a peak detecting circuit 22. An output of this peak detecting circuit 22 is supplied through an amplifier 23 to a Junction P among resistors 15R, 15G, 15B as a reference voltage.

In the automatic knee control circuit 10C of FIG. 3, when the input level is high, the knee point is decreased, while when the input level is low, the knee point is increased.

Figure 4:
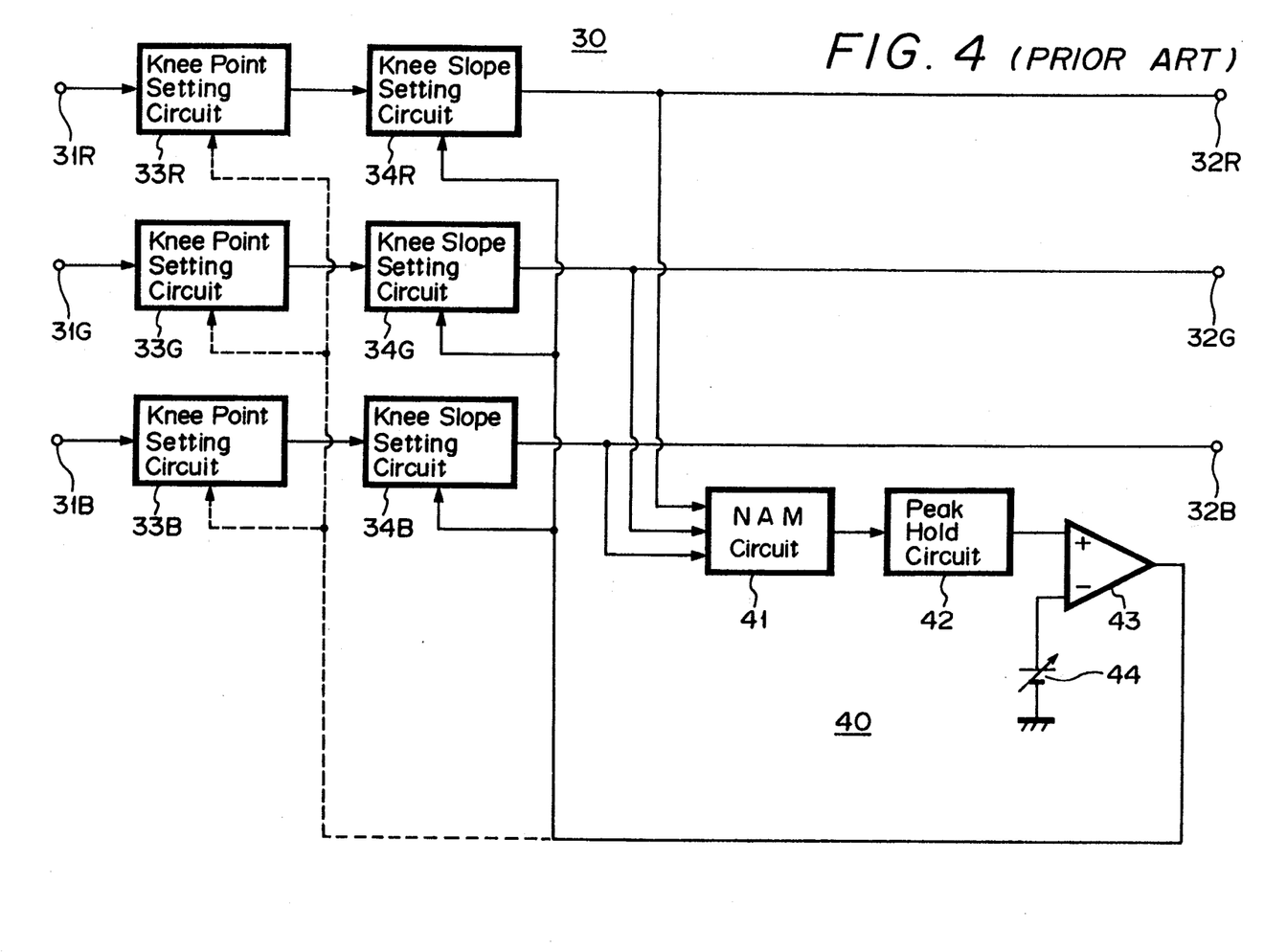
FIG. 4 is a schematic diagram showing another example of the automatic knee control circuit according to the prior art.

Further, an automatic knee control circuit 30 shown in FIG. 4 also is known.

In the automatic knee control circuit 30 of FIG. 4, knee point setting circuits 33R, 33G, 33B and knee slope setting circuits 34R, 34G, 34B are connected in series between three sets of input terminals 31R, 31G, 31B and output terminals 32R, 32G, 32B of the knee circuit 30, respectively.

Outputs of the knee slope setting circuits 34R, 34G and 34B are all supplied to a non-additive mixing (NAM) circuit 41 of a control circuit 40, and the signal of the highest level in the three signals is supplied from the NAM circuit 41 to a peak hold circuit 42. An output from this peak hold circuit 42 is supplied to a comparator 43, in which it is compared with a voltage V44 of a variable voltage source 44. An output of the comparator 43 is commonly supplied to the respective knee point setting circuits 33R, 33G, 33B or the knee slope setting circuits 34R, 34G, 34B.

In the automatic knee control circuit 30 of FIG. 4, the knee point or the knee slope is automatically controlled in response to the high or the low of the input level and the variable reference voltage V44 of the variable voltage source 44.

Incidentally, with regard to the prior art of FIG. 4, when a picture is produced, it is frequently observed that the knee point and knee slope are both properly controlled in response to the user's intention in the picture production.

However, in the earlier-noted conventional automatic knee control circuits, e.g., as in FIGS. 1 and 3, only either one of the knee point and the knee slope is controlled and the other characteristic is not changed, i.e., it is previously set so that only a standardized picture can be obtained. Consequently, a proper signal processing state corresponding to the user's particular production intention cannot always be set.

OBJECTS AND SUMMARY OF THE INVENTION

Accordingly, it is an object of the present invention to provide an improved automatic knee control circuit in which the aforenoted shortcomings and disadvantages encountered with the prior art can be eliminated.

More specifically, it is an object of the present invention to provide an automatic knee control circuit in which a wide variety of signal processing states can be set with ease so that the cameraman can produce a variety of pictures according to various intentions.

Another object of the present invention is to provide an automatic knee control circuit in which a knee point and a knee slope can be detected and adjusted with ease without risk of the occurrence of error.

As an aspect of the present invention, an automatic knee control circuit for a video camera having an image sensing circuit for generating a video signal is comprised of a video signal compressing circuit supplied with the video signal and including a series circuit of a knee point setting circuit and a knee slope setting circuit, a detecting circuit supplied with the output of the video signal compressing circuit for generating a detected output, and a control signal generating circuit supplied with the detected output for generating a first control signal and a second control signal. The control signal generating circuit includes a signal dividing circuit for dividing a signal corresponding to the detected output into the first and second control signals with a predetermined dividing ratio, a first circuit for supplying the first control signal to the knee point setting circuit such that the knee point setting circuit controls the knee point in accordance with the first control signal, and a second circuit for supplying the second control signal to the knee slope setting circuit such that the knee slope setting circuit controls the knee slope in accordance with the control signal.

The above, and other objects, features and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

A first embodiment of the automatic knee control circuit according to the present invention will now be described with reference to FIGS. 5 and 6.

Figure 5:
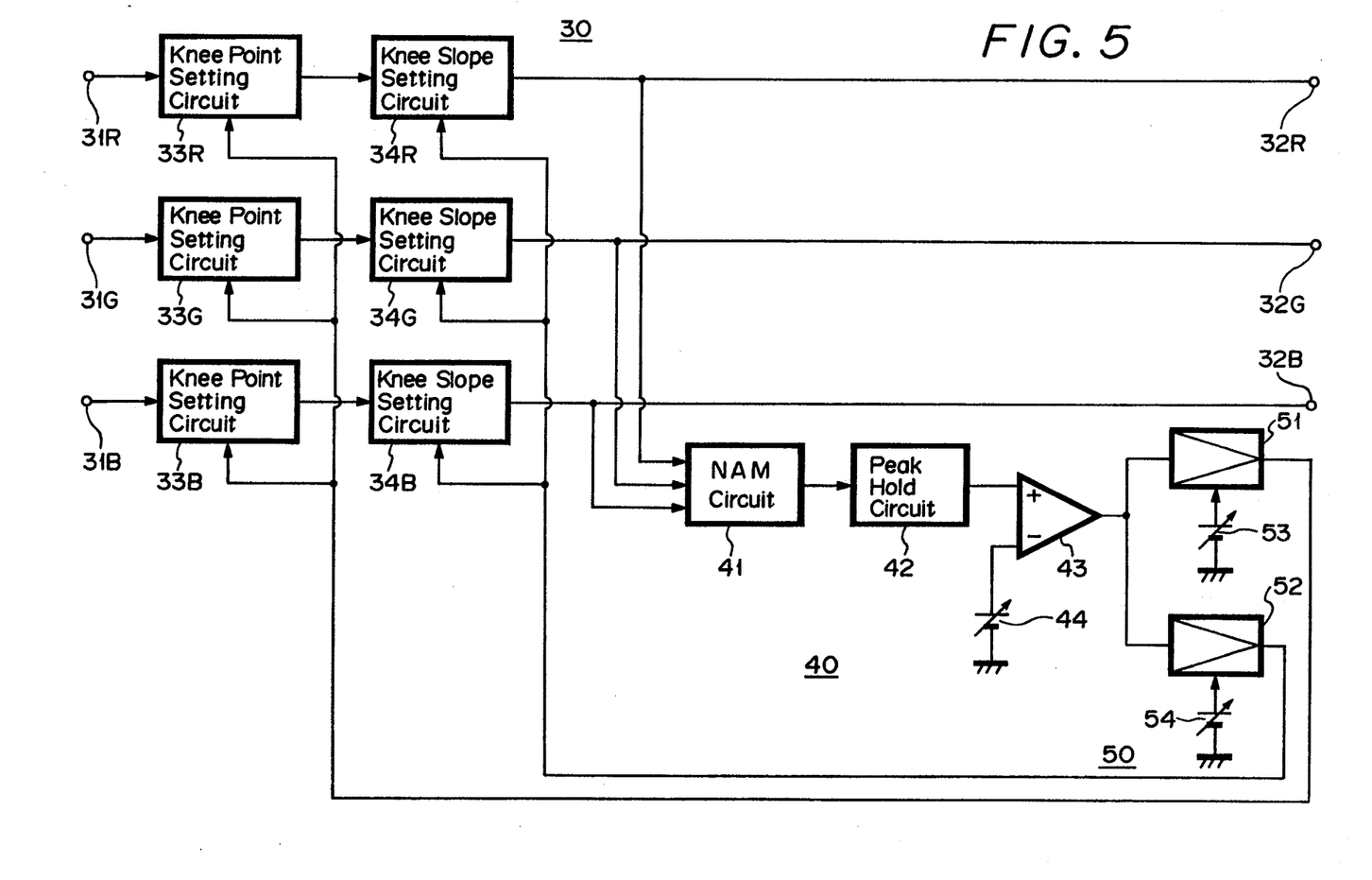
FIG. 5 is a schematic block diagram of a first embodiment of an automatic knee control circuit according to the present invention.
Figure 6:
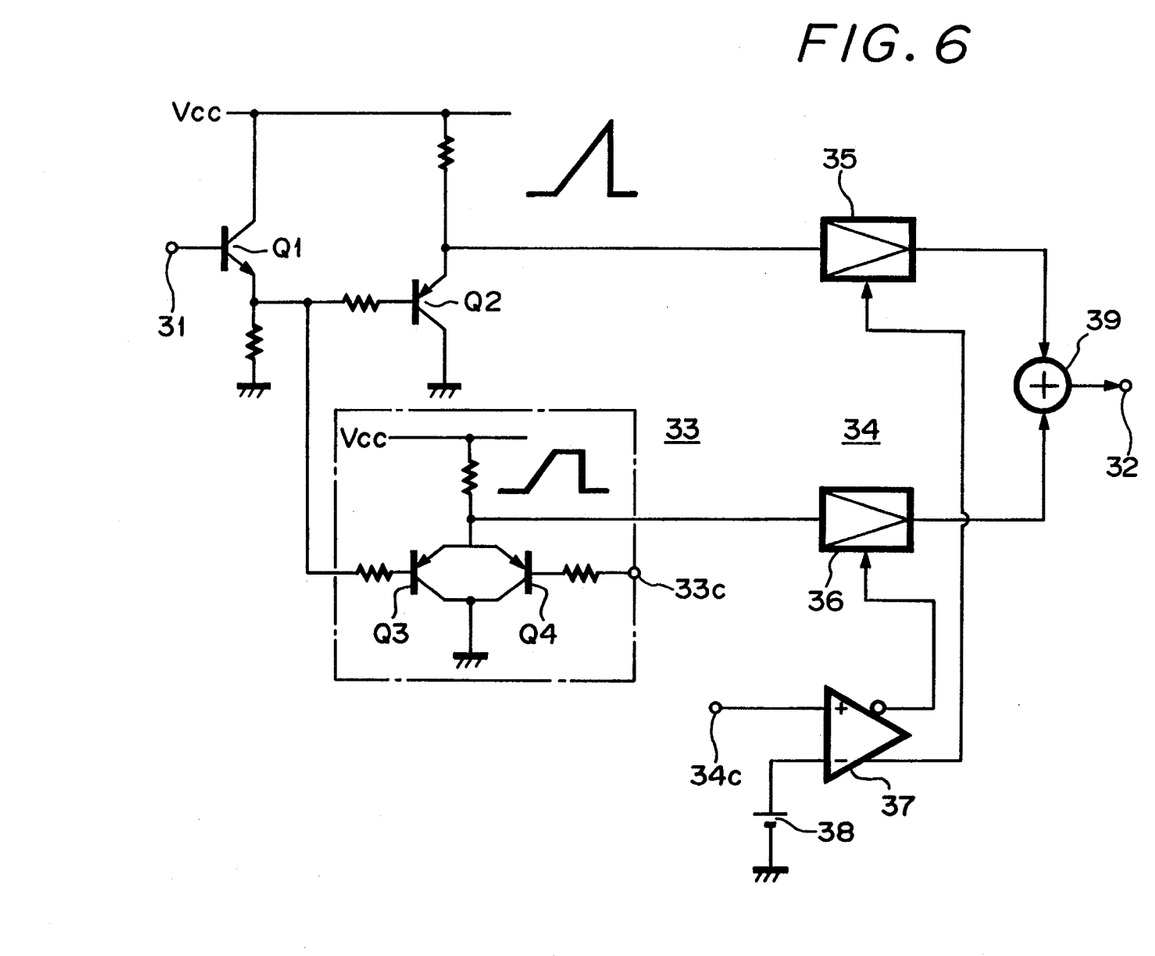
FIG. 6 is a schematic diagram showing a main portion of the automatic knee control circuit of FIG. 5.

FIG. 5 shows an overall arrangement of the first embodiment 30 of the present invention, and FIG. 6 shows a main portion thereof. In FIG. 5, like parts corresponding to those of FIG. 4 are marked with the same references and therefore need not be described.

Referring to FIG. 5, there is provided a distributing circuit 50 which includes a pair of gain control amplifiers 51, 52, and the gains of the two amplifiers 51 and 52 are controlled by voltage values of the control voltage sources 53, 54, respectively. The output of the comparator 43 is commonly supplied to the gain control amplifiers 51, 52, and an output of one amplifier 51 is commonly supplied to the knee point setting circuits 33R, 33G and 33B. Also, an output of the other amplifier 52 is commonly supplied to the knee slope setting circuits 34R, 34G and 34B, and the rest of this automatic knee control circuit 30 is constructed similarly to FIG. 4.

In the first embodiment of the present invention, the knee point setting circuits 33R, 33G, 33B and the knee slope setting circuits 34R, 34G, 34B are each constructed as shown in FIG. 6.

As FIG. 6 shows, a video signal applied to the input terminal 31 is supplied through an emitter-follower npn transistor Q1 to the bases of emitter-follower transistors Q2 and Q3. The collector and emitter of the npn transistor Q4 are commonly connected to those of the transistor Q3 and the base of the transistor Q4 is connected to a control terminal 33c, thereby forming the knee point setting circuit 33.

An output of the transistor Q2 is supplied to one gain control amplifier 35 of the knee slope setting circuit 34, and the other gain control amplifier 36 is supplied with an output of the knee point setting circuit 33. A control terminal 34c and one input terminal of a differential amplifier 37 are connected together and a reference voltage source 38 is connected to the other input terminal of the differential amplifier 37. Outputs of positive phase and opposite phase of the differential amplifier 37 are supplied, respectively, to the two gain control amplifiers 35 and 36 as control signals, and the outputs of the amplifiers 35, 36 are fed through an adder 39 to an output terminal 32.

Operation of the first embodiment will be described below.

Referring to FIG. 6, when a control voltage V33 is supplied to the control terminal 33c of the knee point setting circuit 33, an emitter potential of the transistor Q4 is restricted by the control voltage V33, and if the base potential of the transistor Q3 is made higher than the control voltage V33 by the input video signal, the emitter potentials of the transistors Q3, Q4 are clipped at a constant value expressed as $$VE = V33 + VF$$

where VF is the forward voltage of the transistor Q3. That is, the knee point Vk is set in response to the control voltage V33, and the knee point setting circuit 33 derives a clipped output.

Further, in the knee slope setting circuit 34, relative power gains of the two gain control amplifiers 35, 36 are differentially controlled as $$A, 1-A \ (0 \leq A \leq 1)$$

Accordingly, for the video signal of level beyond the knee point, a video signal having knee slope of unity i.e., 1, from the transistor Q2 and a video signal having a null, i.e., 0, knee slope from the transistor Q3 are added with a ratio corresponding to the control voltage V34 supplied to the terminal 34c to thereby set an intermediate knee slope between 1 and 0. For a video signal of level less than the knee point, the outputs of the transistors Q2 and Q3 both become video signals of unity knee slope so that, regardless of the value of the control voltage V34, an output of knee slope A can be obtained constantly.

As shown in FIG. 5, a variable voltage V44 of the voltage source 44 is employed as a knee point setting control voltage. Also, a voltage V53 of one control voltage source 53 in the distributing circuit 50 is set at the center of the variable range and a voltage V54 of the other control voltage source 54 can be varied in the entire range, whereby relative power gains of the two gain control amplifiers 51 and 52 are set as follows.

$$A51 = \tfrac{1}{2}; \ 0 \leq A52 \leq 1$$

In case the relative gain A52 of the amplifier 52 is zero (A52=0), the output of the comparator 43 is entirely supplied to the knee point setting circuits 33R, 33G and 33B, whereby the knee slope is constant and hence the knee point can be controlled.

In case the relative gain A52 of the amplifier 52 is 1 (A52 = 1), then a corresponding large part of the output of the comparator 43 is supplied to the knee slope setting circuits 34R, 34G and 34B, whereby the knee slope can be controlled under the condition such that the knee point is not greatly changed.

The opposite effect can be obtained by setting A52=1 and varying A51 in a range 0<A51<1. This way the knee point can be constant while the knee slope is varied.

In case of the normal condition that the relative gain A52 of the amplifier 52 falls in a range of 0<A52<1, the knee point and the knee slope can both be varied, and the control can be varied linearly, thereby setting a wide variety of signal processing states with ease.

Incidentally, while the relative gain of one amplifier 51 in the distributing circuit 50 is fixed to 0.5 in the first embodiment of FIG. 5, the relative gains of the two amplifiers 51 and 52 can be controlled differentially similarly to amplifiers 35 and 36 in FIG. 6.

While in the embodiment of FIG. 5 the peak hold circuit 42 is used as a means for detecting the output signal of the knee circuit, a mean value detecting circuit and a peak detecting circuit may be used and outputs of the two detecting circuits may be properly mixed.

As set out above in detail, in the above embodiment of the automatic knee control circuit according to the present invention, a wide variety of signal processing states can be set with ease. The distributing circuit is provided to distribute the output of the comparing circuit, which output corresponds to the output signal of the knee circuit to set the knee point and the knee slope of the input video signal by an arbitrary distributing ratio. The setting of the knee point is controlled on the basis of the first distributed output and the setting of the knee slope is controlled on the basis of the second distributed output. Therefore, it is possible to obtain an automatic knee control circuit with which pictures corresponding to the cameraman's intention can be produced.

A set-up method of the above-mentioned knee control circuit will be described next.

As described above in connection with FIG. 2, the known white level compression (knee) characteristic is linear up to the predetermined input level (knee point level), while for the input signal whose level exceeds the knee point K, the output signal is compressed with the predetermined compression ratio so that the change (knee slope) of the output level becomes gentle as shown by the straight line L.

However, when a test signal of sloped waveform is used as in the prior art, a window pulse for a sampling of the output video signal on lines 32R, 32G and 32B has a finite duration Tw so that a sliced signal, i.e., the sampled voltage on the line is integrated by the window period of duration Tw. As a consequence, particularly in the non-linear signal processing such as white level compression (knee) or the like, there arises a problem that accurate level detection and level adjustment cannot be always carried out.

Figure 7:
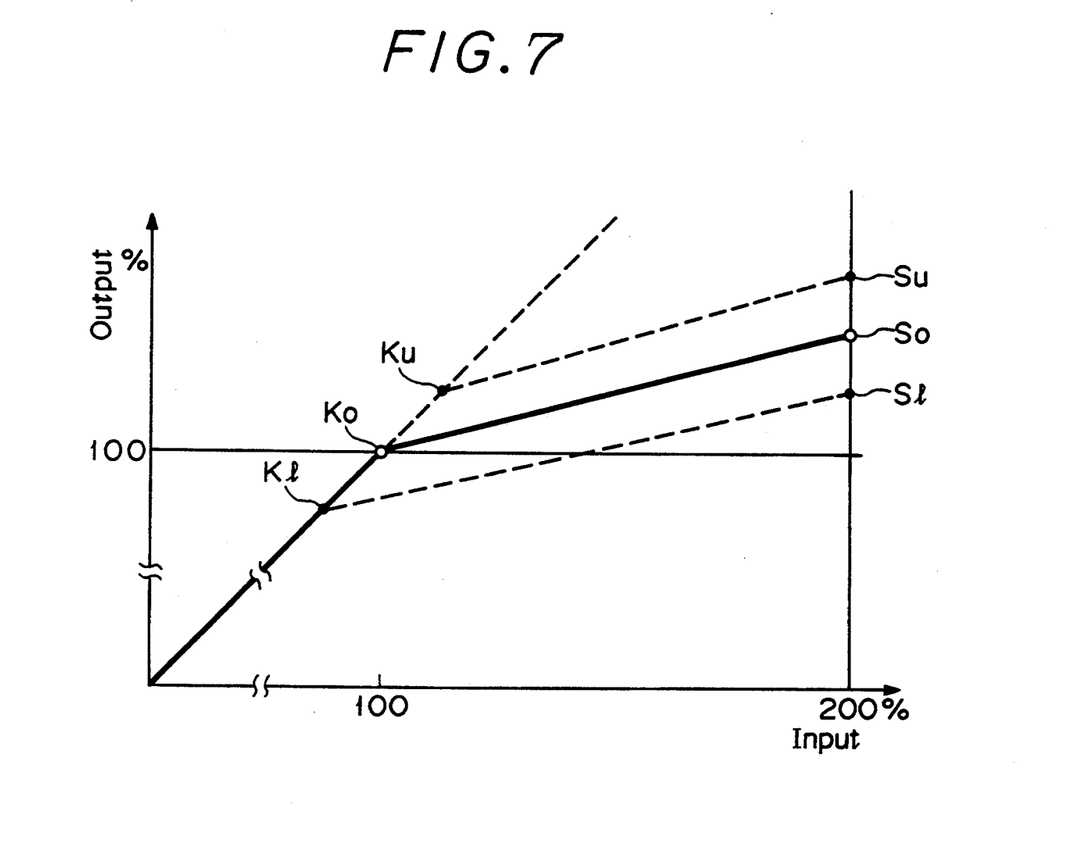
FIG. 7 is a characteristic graph of the input and output characteristics of the conventional knee circuit, and to which reference will be made in explaining further disadvantages of the prior art.

Furthermore, in the conventional knee circuit, the two characteristics of knee point and knee slope are effectively interrelated so that, as shown in FIG. 7, for example, when the knee point is deviated from the correct knee point Ko and erroneously set at Ku or Kl, then even if the knee slope is correct, the maximum output level will fluctuate from Su to Sl from the correct output level So. Accordingly, the level adjustment cannot be carried out without difficulty.

A second embodiment of the present invention illustrates a knee control circuit in which the knee point and the knee slope can be detected and adjusted independently with ease.

The second embodiment of the knee control circuit, which is suitable for the auto set up, according to the present invention will be described with reference to FIGS. 8 and 9.

Figure 8:
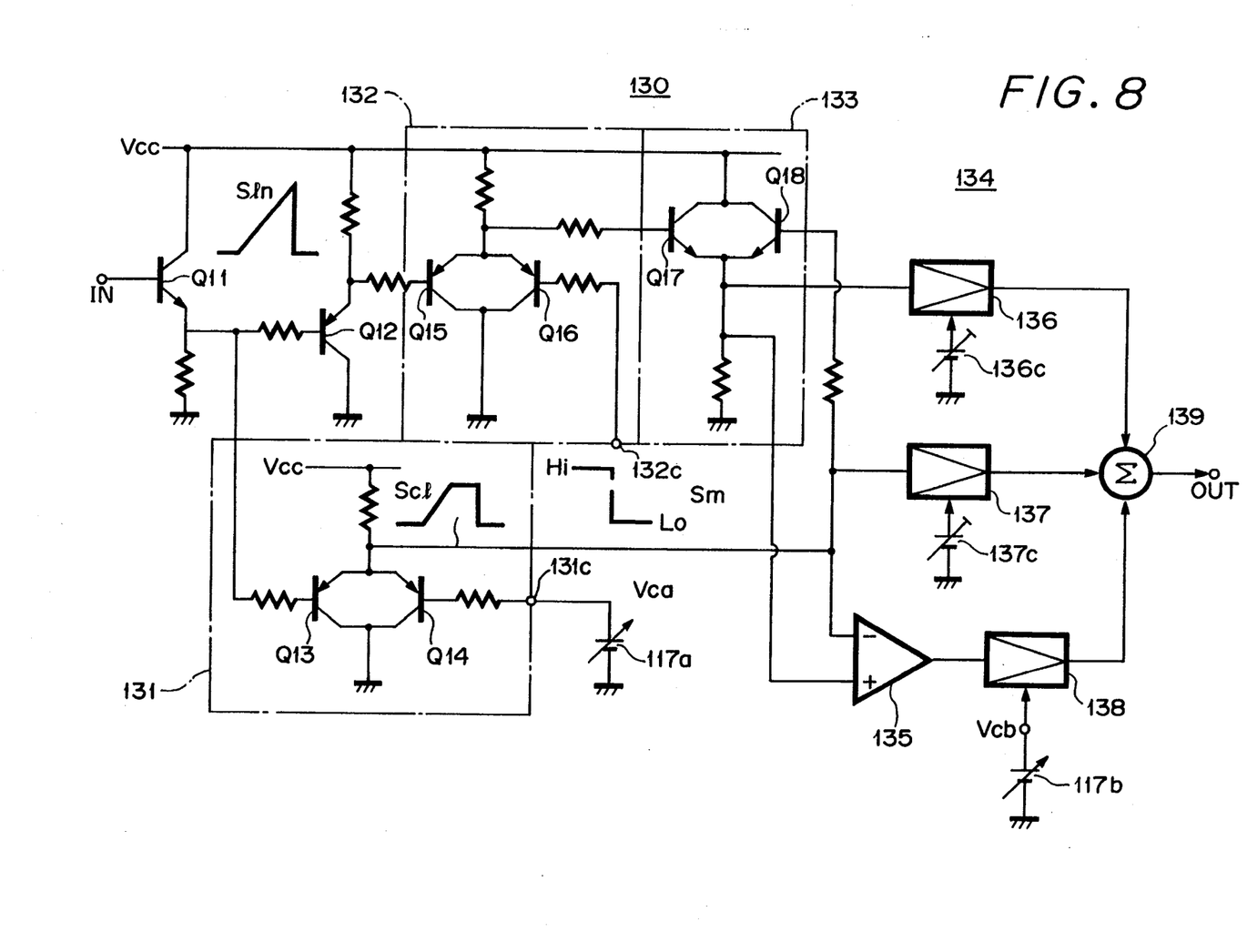
FIG. 8 is a schematic diagram showing a second embodiment of the automatic knee control circuit according to the present invention.

As shown in FIG. 8, there is provided a white level compressing (knee) control circuit 130 which is provided with a compression start level (knee point) setting circuit 131 and a knee slope setting circuit 134. In the initial adjustment, a test signal Sln applied to a terminal IN is commonly supplied through an emitter-follower npn transistor Q11 to the bases of emitter-follower pnp transistors Q12 and Q13. The collector and emitter of the pnp transistor Q14 are commonly connected to those of the transistor Q13, and a variable voltage source 117a is connected through a control terminal 131c to the base of the transistor Q14, thereby forming the knee point setting circuit 131.

An output of the transistor Q12 is supplied to the base of one pnp transistor Q15 of a non-additive mixing (NAM) circuit 132 which is constructed similarly to the setting circuit 131 for detecting a minimum value, and the other pnp transistor Q16 is supplied at its base with a knee characteristic adjusting mode switching signal Sm from a control terminal 132c.

A pair of npn transistors Q17, Q18 having a common emitter resistor constitute a second non-additive mixing (NAM) circuit 133 which is used to detect a maximum value, and an output of the NAM circuit 132 is supplied to the base of an npn transistor Q17. An output of the knee point setting circuit 131 is supplied to the base of the other npn transistor Q18.

An output of the NAM circuit 133 is commonly supplied to one input terminal of a differential amplifier 135 of a knee slope setting circuit 134 and a gain control amplifier 136. An output of the knee point setting circuit 131 is commonly supplied to the other input terminal of the differential amplifier 135 and a gain control amplifier 137. An output of the differential amplifier 135 is supplied through a gain control amplifier 138 to an adder 139, and outputs of the gain control amplifiers 136, 137 are supplied to the adder 139 whose output is fed to an output terminal OUT.

In this embodiment, control voltages of voltage sources 136c and 137c are set such that relative gains G136, G137 of the two amplifiers 136, 137 become 0.5, and the amplifier 138 is supplied with a variable control voltage Vcb from a voltage source 117b.

Operation of this embodiment will be described with reference to FIG. 9.

In the initial adjustment of the knee control circuit 130 of FIG. 8, in order to obtain the predetermined knee characteristic shown in FIG. 2 with ease, the mode switching signal Sm fed to the NAM circuit 132 is made low level in the knee point mode while made [high] level in the knee slope mode.

Initially, in the knee point mode, when a variable control voltage Vca is supplied to the control terminal 131c of the knee point setting circuit 131, the emitter potential of the transistor Q14 is restricted by the control voltage Vca so that, when the base potential of the transistor Q13 is made higher than Vca by the linear test signal Sln of slope waveform, the emitter potential of the transistors Q13, Q14 is clipped at the following constant value $$VE = Vca + VF$$

Figure 9:
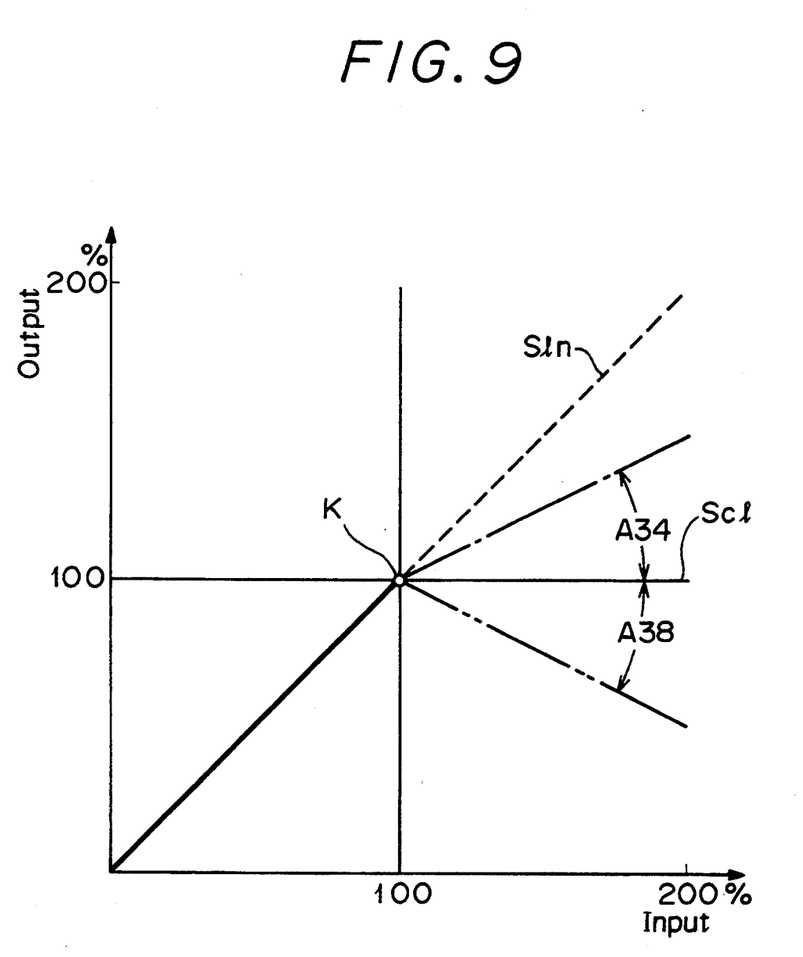
FIG. 9 is a characteristic graph of the input and output characteristics of the automatic knee control circuit of FIG. 8.

That is, the knee point K is set in response to the control voltage Vca and the knee point setting circuit 131 derives the clipped output signal Scl shown in FIG. 9. The slope of this clipped output signal Scl becomes null i.e., 0, as shown in FIG. 9.

On the other hand, since the mode switching signal Sm of low level is supplied to the terminal 132c of the NAM circuit 132 and the transistor Q16 is in its ON state, the NAM circuit 132 outputs a signal of low level, thereby turning the transistor Q17 of the NAM circuit 133 OFF.

Under this state, when the clipped output signal Scl of the knee point setting circuit 131 is supplied to the base of the transistor Q18 in the NAM circuit 133, the NAM circuit 133 outputs the illustrated clipped output signal Scl from the first NAM circuit 132 which is similar to the input clipped output signal supplied thereto.

The output of the NAM circuit 133 and the output of the knee point setting circuit 131 are supplied through the amplifiers 136 and 137 to the adder 139, in which they are added and the output signal of a predetermined level is fed to the output terminal OUT regardless of the high or low level of the mode switching signal Sm.

A detection signal Sd is sliced from this by the NAM circuit 41 and the peak hold circuit 42, and a proper control signal is supplied to the adjustment voltage source 117a on the basis of the level of this signal Sd, thereby setting up the knee point.

In that event, in the differential amplifier 135, the voltage of the input at the base of the transistor Q18 and of the output from the emitter thereof substantially cancel each other out, whereby the control voltage Vcb of the amplifier 138 is made constant regardless of the setting of the knee point.

In the knee slope mode, the mode switching signal Sm supplied to the NAM circuit 132 is made high level as set forth above, so that the linear test signal Sln of the sloped waveform is input to the base of the transistor Q17.

Therefore, in this case, the knee point setting circuit 131 again outputs the clipped output signal Scl as described above.

Further, in the NAM circuit 132, the transistor Q16 is turned OFF so that the DC level of the linear test signal Sln input to the base of the transistor Q17 is increased by the forward voltage VF of transistor Q15 in DC level and output from the emitter of the transistor Q15, which is then fed to the base of the transistor Q17 in the NAM circuit 133.

At that time, although the clipped output signal Scl is supplied to the base of the transistor Q18 from the knee point setting circuit 131, if the level of the input signal is beyond the knee point, the test linear signal Sln from the NAM circuit 132 becomes higher in level than the clipped output signal Scl with the result that the linear signal Sln is output from the NAM circuit 133. As shown by a dashed line in FIG. 9, the slope characteristic of the linear output Sln is 1.

The clipped output Scl whose slope characteristic is 0 from the knee point setting circuit 131 and the linear output Sln whose slope characteristic is 1 from the NAM circuit 133 are supplied through the amplifiers 136 and 137, each having the relative gain 0.5 to the adder 139, in which they are added together. Then, the added slope characteristic at that portion is fixed to +0.5 as shown by the one dot chain line in FIG. 9.

On the other hand, the clipped output Scl of the knee point setting circuit 131 and the linear output Sln of the NAM circuit 133 are supplied to the differential amplifier 135, and the differential output (opposite polarity) of the differential amplifier 135 is supplied through the gain control amplifier 138 to the adder 139, being thereby added to the outputs of the amplifiers 136 and 137.

In this embodiment, the relative gain of the amplifier 138 is controlled by the control voltage Vcb within the following range $$0 \leq G138 \leq 0.5$$

Accordingly, the slope characteristics of the amplifiers 135, 138 are changed in a region A38 ranging from 0 to −0.5 shown by a two-dot chain line in FIG. 9.

Therefore, the synthesized slope characteristic of the knee slope setting circuit 134 is controlled within the region A34 from 0 to +0.5 and cannot exceed 0.5 as in the case that the relative gains of the amplifiers 136, 137 are controlled differentially.

Then, similarly to the setting of the knee point, the detection signal Sd is sliced from the output signal fed to the output terminal OUT, and the proper control signal is supplied to the adjustment voltage source 117b on the basis of the detection signal Sd, thereby the set-up of the knee slope being performed.

According to the above-mentioned second embodiment, since the transmission of the linear output signal Sln is controlled by using the NAM circuits 132, 133 and the mode switching signal Sm, the knee point and the knee slope can be detected and adjusted and without the occurrence of error accurately and easily.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. An automatic knee control circuit for a video camera having image sensing means generating a video signal, said automatic knee control circuit comprising:
    video signal compressing means supplied with said video signal and providing an output video signal, said video signal compressing means including knee point setting means and knee slope setting means, said knee point setting means receiving said video signal and a first control signal and producing a knee point output signal and said knee slope setting means receiving said knee point output signal and a second control signal and producing said output video signal;
    detecting means supplied with said output video signal of said video signal compressing means, for generating a detected output; and
    control means supplied with said detected output for generating said first control signal and said second control signal, said control signal generating means including signal dividing means for dividing said detected output into said first and second control signals with a first predetermined dividing ratio and a second predetermined dividing ratio, respectively;

wherein said first control signal produced by said control means in accordance with said first predetermined dividing ratio is supplied to said knee point setting means for controlling a knee point and said second control signal produced by said control means in accordance with said second predetermined ratio is supplied to said knee slope setting means for controlling a knee slope;

whereby said knee point setting means and said knee slope setting means are independently controlled;

said video signal compressing means further comprises:

first level control means supplied with a first processed input video signal for providing a first level control output signal;

clipping means comprised in said knee point setting means for receiving a second processed input video signal and said first control signal, said clipping means providing said knee point output signal;

second level control means supplied with said knee point output signal from said clipping means for providing a second level control output signal;

adder means for adding said first level control output signal and said second level control output signal; and said knee slope setting means comprising means for controlling said first level control output signal and said second level control output signal differentially in accordance with said second control signal.

2. An automatic knee control circuit according to claim 1, wherein said detecting means includes peak detecting means for detecting a peak value of said output video signal.

3. An automatic knee control circuit according to claim 1, wherein said signal dividing means includes a first gain control amplifier and a second gain control amplifier each of which receive said detected output and means for controlling the gains of said first and second control amplifiers to produce said first control signal and said second control signal, respectively.

4. An automatic knee control circuit according to claim 1, wherein said video camera comprises first, second and third image sensing means for respectively producing first, second, and third video signals, said video signal compressing means comprising first, second and third image compressing means for respectively receiving said first, second, and third video signals and for producing first, second, and third output video signals, and said detecting means comprising nonadditive mixing means supplied with said first, second and third output video signals.

5. An electronic device comprising a knee control circuit, said control circuit comprising:

an input stage for receiving an input video signal and for generating a processed input video signal;

knee point control means connected to said input stage for receiving said processed input video signal and a knee point control signal specifying a knee point and for providing a knee point output signal by clipping said processed input video signal at said knee point for values of said processed input video signal above said knee point; and knee slope control means receiving a second processed input video signal from said input stage, said knee point output signal from said knee point control means, and a knee slope control signal specifying a knee slope, and for providing a knee slope output video signal;

wherein said knee slope output video signal of said knee slope control means corresponds to said input video signal with values above said knee point being compressed according to said knee slope;

wherein said knee slope control means further comprises:

first gain means receiving said second processed input video signal from said input stage and a first gain control signal specifying a first gain level and for providing a first gain output signal in accordance with said first gain level;

second gain means receiving said knee point output signal from said knee point control means and a second gain control signal specifying a second gain level and for providing a second gain output signal in accordance with said second gain level;

gain control means for receiving said knee slope control signal and for outputting said first gain control output signal and said second gain control output signal in accordance with said knee slope control signal; and summation means for outputting said output video signal as the sum of said first gain output signal and said second gain output signal.

6. The electronic device of claim 5, wherein said gain control means comprises a differential amplifier receiving said knee slope control signal and a variable voltage, said differential amplifier providing said first gain control signal and said second gain control signal respectively for said first and second gain means so that changes in gain for said first and second gain means are equal and opposite.

7. The electronic device of claim 5, further comprising:

detection means for detecting a maximum level of said output video signal and for outputting a detected signal; and knee control signal generating means for receiving said detected signal from said detection means and for outputting said knee point control signal and said knee slope control signal.

8. The electronic device of claim 7, wherein said knee control signal generating means comprises:

a differential amplifier receiving said detected signal from said detection means and a variable voltage and providing a differential output signal corresponding to the difference between said detected signal and said variable voltage; and first gain means and second gain means each receiving said differential output signal from said differential amplifier, said first gain means generating said knee point control signal in accordance with a first gain control variable voltage and said second gain means generating said knee slope control signal in accordance with a second gain control variable voltage.

9. An electronic device comprising a knee control circuit, said control circuit comprising:

an input stage for receiving an input video signal and for generating a processed input video signal;

knee point control means connected to said input stage for receiving said processed input video signal and a knee point control signal specifying a knee point and for providing a knee point output signal by clipping said processed input video signal at said knee point for values of said processed input video signal above said knee point; and knee slope control means receiving a second processed input video signal from said input stage, said knee point output signal from said knee point control means, and a knee slope control signal specifying a knee slope, and for providing a knee slope output video signal;

wherein said knee slope output video signal of said knee slope control means corresponds to said input video signal with values above said knee point being compressed according to said knee slope;

first and second stages successively located between said input stage and said knee slope control means, said first stage receiving said processed input video signal from said first stage and a mode signal for selecting operation between a point mode and a slope mode for respectively setting said knee point and said knee slope, said first stage producing a first stage output signal which is a signal corresponding to said input signal when said slope mode is indicated by said mode signal, said second stage receiving said first stage output signal from said first stage and said knee point output signal from said knee point control means and producing a second stage output signal corresponding to said input video signal when said slope mode is indicated by said mode signal;

wherein said knee slope control means receives said second stage output signal as said second processed input video signal.

10. The electronic device of claim 9, wherein said knee slope output signal from said knee slope control means corresponds to said input video signal with values of said input video signal above said knee point compressed according to said knee slope mode when said slope mode is indicated by said mode signal.

11. An automatic knee control circuit according to claim 10, wherein said knee slope control means comprises:

first gain means for receiving said second stage output signal from said second stage and a first gain control signal specifying a first gain level and for providing a first gain output signal in accordance with said first gain level;

second gain means for receiving said knee point output signal from said knee point control means and a second gain control signal specifying a second gain level and for providing a second gain output signal in accordance with said second gain level;

a differential amplifier for receiving said knee point output signal from said knee point control circuit and said second stage output signal from said second stage, said differential amplifier producing a differential output signal;

third gain means for receiving said differential output signal from said differential amplifier and said knee slope control signal and for providing a third gain output signal in accordance with a gain specified by said knee slope control signal; and summation means for outputting said output video signal as a sum of said first, second and third gain output signals.

12. The electronic device of claim 5, comprising three knee control circuits each receiving a respective one of three input video signals, said three input video signals comprising three color signals of a video camera, said device comprising:

detection means for receiving three knee slope output video signals from said knee control circuits and for producing a detected output; and distribution means for receiving said detected output from said detection means and for producing a knee point control signal and a knee slope control signal for each of said knee control circuits.

13. The electronic device of claim 12, wherein said distribution means comprises:

a differential amplifier for receiving said detected output from said detection means and a variable voltage and for producing a differential output signal; and first and second amplifiers each receiving said differential output signal from said differential amplifier and a respective first or second gain control voltage for respectively producing said knee point control signal and said knee slope control signal.

14. The electronic device of claim 8, comprising three knee control circuits each receiving a respective one of three input video signals, said three input video signals comprising three color signals of a video camera, said device comprising:

detection means for receiving each of the three knee slope output signals from said knee control circuits and for producing a detected output; and distribution means for receiving said detected output from said detection means and for producing a knee point control signal and a knee slope control signal for each of said knee control circuits.

15. The electronic device of claim 14, wherein said distribution means comprises:

a differential amplifier for receiving said detected output from said detection means and a variable voltage and for producing a differential output signal; and first and second amplifiers each receiving said differential output signal from said differential amplifier and a respective first or second gain control voltage for respectively producing said knee point control signal and said knee slope control signal.

16. The electronic device of claim 11, comprising three knee control circuits each receiving a respective one of three input video signals, said three input video signals comprising three color signals of a video camera, said device comprising:

detection means for receiving each of the three knee slope output video signals from said knee control circuits and for producing a detected output; and distributing means for receiving said detected output from said detection means and for producing a knee point control signal and a knee slope control signal for each of said knee control circuits.

17. The electronic device of claim 16, wherein said distribution means comprises:

a differential amplifier for receiving said detected output from said detection means and a variable voltage and for producing a differential output signal; and first and second amplifiers each receiving said differential output signal from said differential amplifier and a respective first or second gain control voltage for respectively producing said knee point control signal and said knee slope control signal.

18. The electronic device of claim 6, further comprising:

detection means for detecting a maximum level of said knee slope output video signal and for outputting a detected signal; and knee control signal generating means for receiving said detected signal from said detection means and for outputting said knee point control signal and said knee slope control signal.

* * * * *